United States Patent
Sawada et al.

(10) Patent No.: US 11,761,364 B2
(45) Date of Patent: Sep. 19, 2023

(54) EXHAUST GAS PURIFICATION DEVICE FOR INTERNAL COMBUSTION ENGINE, AND VEHICLE

(71) Applicant: Isuzu Motors Limited, Tokyo (JP)

(72) Inventors: Akihiro Sawada, Fujisawa (JP); Masanobu Minezawa, Fujisawa (JP)

(73) Assignee: Isuzo Motors Limited, Yokohama (JP)

( * ) Notice: Subject to any disclaimer, the term of this patent is extended or adjusted under 35 U.S.C. 154(b) by 74 days.

(21) Appl. No.: 17/424,759

(22) PCT Filed: Jan. 20, 2020

(86) PCT No.: PCT/JP2020/001723
§ 371 (c)(1),
(2) Date: Jul. 21, 2021

(87) PCT Pub. No.: WO2020/153302
PCT Pub. Date: Jul. 30, 2020

(65) Prior Publication Data
US 2022/0136419 A1    May 5, 2022

(30) Foreign Application Priority Data
Jan. 23, 2019  (JP) .................. 2019-009471

(51) Int. Cl.
| | |
|---|---|
| *F01N 3/20* | (2006.01) |
| *F01N 11/00* | (2006.01) |
| *F01N 3/08* | (2006.01) |
| *F01N 3/029* | (2006.01) |
| *F01N 9/00* | (2006.01) |

(52) U.S. Cl.
CPC ............ *F01N 3/208* (2013.01); *F01N 11/002* (2013.01); *F01N 3/0293* (2013.01); *F01N 3/0814* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 2010/0028228 A1* | 2/2010 | Gady | ................. | B01D 53/9495 |
| | | | | 422/111 |
| 2010/0257844 A1 | 10/2010 | Shimomura et al. | | |

(Continued)

FOREIGN PATENT DOCUMENTS

| | | |
|---|---|---|
| CN | 104220710 | 12/2014 |
| CN | 108412589 | 8/2018 |

(Continued)

OTHER PUBLICATIONS

International Search Report for corresponding International Application No. PCT/JP2020/001723: dated Mar. 31, 2020.

*Primary Examiner* — Binh Q Tran

(57) ABSTRACT

Provided is an exhaust gas purification apparatus having a control device that monitors the transition of a detection value of each of an upstream NOx sensor and a downstream NOx sensor, and when the NOx purification rate of the SCR catalyst falls to a value of a first threshold or lower, generates an abnormality detection signal indicating that an over storage state has occurred in an SCR catalyst if the amount of change in the detection value of the upstream NOx sensor per unit time is at least a second threshold and the amount of change in the detection value of the downstream NOx sensor per unit time is at most a third threshold.

6 Claims, 9 Drawing Sheets

(52) U.S. Cl.
CPC ............ *F01N 3/0885* (2013.01); *F01N 3/206* (2013.01); *F01N 3/2066* (2013.01); *F01N 3/2073* (2013.01); *F01N 9/007* (2013.01); *F01N 2250/12* (2013.01); *F01N 2550/20* (2013.01); *F01N 2560/026* (2013.01); *F01N 2570/14* (2013.01); *F01N 2610/02* (2013.01); *F01N 2610/1453* (2013.01); *F01N 2900/04* (2013.01); *F01N 2900/0402* (2013.01); *F01N 2900/0412* (2013.01); *F01N 2900/0416* (2013.01); *F01N 2900/1402* (2013.01); *F01N 2900/1602* (2013.01); *F01N 2900/1622* (2013.01); *F01N 2900/1806* (2013.01)

(56) References Cited

U.S. PATENT DOCUMENTS

| | | |
|---|---|---|
| 2011/0099977 A1 | 5/2011 | Takahashi |
| 2011/0265461 A1* | 11/2011 | Shibata .................. F01N 11/00 60/287 |
| 2015/0151251 A1 | 6/2015 | Gaudin |
| 2016/0201541 A1 | 7/2016 | Matsumoto et al. |
| 2016/0369683 A1* | 12/2016 | Matsumoto ............. F01N 3/208 |
| 2017/0191394 A1 | 7/2017 | Minezawa et al. |
| 2018/0230879 A1 | 8/2018 | Saitoh et al. |
| 2019/0195107 A1* | 6/2019 | Shirasawa ............... F01N 3/208 |
| 2019/0249586 A1* | 8/2019 | Takada .................... F01N 11/00 |
| 2019/0284980 A1* | 9/2019 | Sakuma .................... F01N 9/00 |
| 2019/0345864 A1* | 11/2019 | Hibino ............... B01D 53/9418 |

FOREIGN PATENT DOCUMENTS

| | | |
|---|---|---|
| JP | 2010-038022 | 2/2010 |
| JP | 2011-094540 | 5/2011 |
| JP | 2012189007 A | 10/2012 |
| WO | 2015046273 A1 | 4/2015 |
| WO | 2015181922 A1 | 12/2015 |
| WO | 2015214899 A | 12/2015 |

* cited by examiner

EXHAUST GAS PURIFICATION DEVICE FOR INTERNAL COMBUSTION ENGINE, AND VEHICLE

CROSS REFERENCE TO RELATED APPLICATIONS

This is the U.S. national stage of application No. PCT/JP2020/001723, filed on Jan. 20, 2020. Priority under 35 U.S.C. § 119(a) and 35 U.S.C. § 365(b) is claimed from Japanese Application No. 2019-009471, filed Jan. 23, 2019, the disclosure of which is also incorporated herein by reference.

TECHNICAL FIELD

The present disclosure relates to an exhaust gas purification apparatus for an internal combustion engine and also relates to a vehicle.

BACKGROUND ART

As an exhaust gas purification apparatus for an internal combustion engine, there is known an SCR catalyst exhaust gas purification system having a NOx Selective Catalytic Reduction (referred to as "SCR catalyst" herein) which selectively reduces NOx in an exhaust gas using ammonia (NH3) as a reducing agent (e.g., see, Patent Literature (hereinafter, referred to as "PTL") 1).

In an exhaust gas purification apparatus of this type, in order to effectively function the NOx reduction characteristics of the SCR catalyst, it is necessary to control the amount of ammonia accumulated in the SCR catalyst (hereinafter, referred to as "ammonia storage amount") to an appropriate amount. As a method for the control, it is general to use a method in which a control unit sequentially predicts the consumed amount of ammonia in the SCR catalyst based on various sensor information and supplies the SCR catalyst with urea water which is a precursor for a lacking amount of ammonia.

CITATION LIST

Patent Literature

PTL 1
Japanese Patent Application Laid-Open No. 2012-189007

SUMMARY OF INVENTION

Technical Problem

The NOx purification reaction in the SCR catalyst is complicated, and it is difficult to accurately compute the consumed amount of ammonia based on the NOx purification reaction in the control unit, however. In addition, the predicted value of the consumed amount of ammonia includes an error due to, for example, an error of the injection amount in a urea-water injection device and/or a detection error of the NOx sensor.

For this reason, it is not rare that an estimation value of the ammonia storage amount estimated by the computation of the control unit deviates from an actual value. Then, there occurs a state where the ammonia storage amount in the SCR catalyst is excessive (hereinafter, referred to as an "over-storage state") due to extension of the deviation in some cases.

When such an over-storage state occurs, the excessive ammonia is desorbed from the SCR catalyst, and the desorbed ammonia changes to NOx due to the oxidation catalyst at a subsequent stage, causing a decrease in the NOx purification performance of the exhaust gas purification apparatus. Further, even when the desorbed ammonia is discharged as ammonia due to the oxidation catalyst at a subsequent stage, a downstream-side NOx sensor of the SCR catalyst detects ammonia as NOx, and it is determined by the controller side that the NOx purification performance is deteriorated.

In addition, when an over-storage state occurs, an extra urea water or ammonia is possibly discharged.

The present disclosure has been made in view of the above-mentioned problems, and an object of the present disclosure is thus to provide an exhaust gas purification apparatus for an internal combustion engine and a vehicle each capable of detecting occurrence of an over-storage state in an SCR catalyst at an early stage.

Solution to Problem

The present disclosure mainly solving the problems mentioned above provides an exhaust gas purification apparatus placed at an exhaust passage of an internal combustion engine, the apparatus including:

a Selective Catalytic Reduction (SCR) catalyst placed in the exhaust passage;

an upstream-side NOx sensor and a downstream-side NOx sensor detecting a NOx amount in an exhaust gas on an upstream side and a downstream side of the SCR catalyst, respectively;

a urea-water injection device which injects urea water on the upstream side of the SCR catalyst in the exhaust passage; and a control device which estimates an ammonia storage amount in the SCR catalyst and controls a urea-water injection amount of the urea-water injection device based on an estimation value of the ammonia storage amount, in which the control device monitors transition of a detection value of each of the upstream-side NOx sensor and the downstream-side NOx sensor, and the control device generates an abnormality detection signal indicating that an over-storage state occurs in the SCR catalyst in a case where a change amount of the detection value of the upstream-side NOx sensor per unit time is equal to or greater than a second threshold value and a change amount of the detection value of the downstream-side NOx sensor per unit time is equal to or less than a third threshold, when a NOx purification rate of the SCR catalyst decreases to a first threshold value or less.

Further, in another aspect, provided is a vehicle including the exhaust gas purification apparatus described above.

Advantageous Effects of Invention

According to an exhaust gas purification apparatus of the present disclosure, occurrence of an over-storage state in an SCR catalyst can be detected at an early stage.

DESCRIPTION OF EMBODIMENTS

Figure 1:
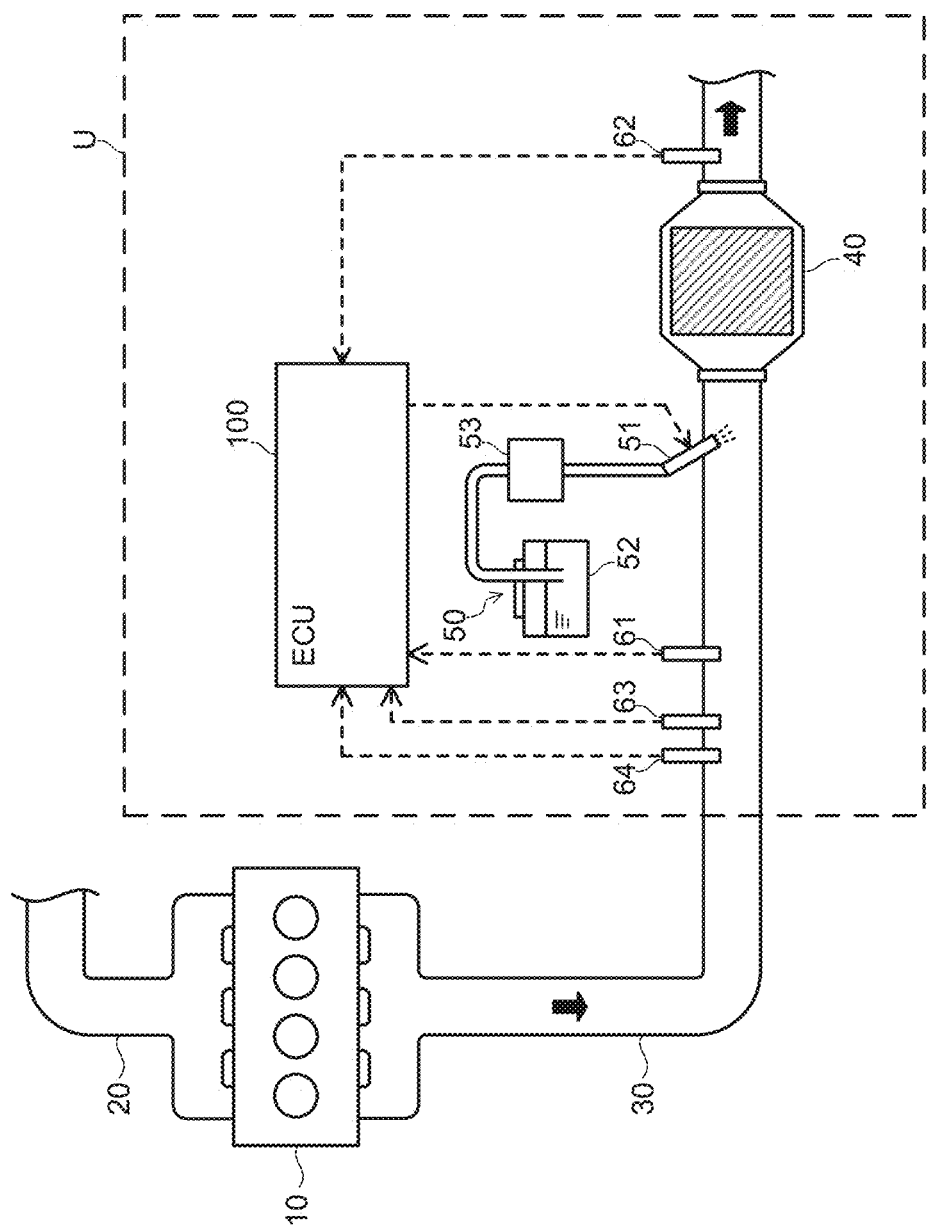
FIG. 1 is a diagram illustrating an exemplary configuration of an exhaust gas purification apparatus according to a first embodiment.

Hereinafter, a detailed description will be given of preferred embodiments of the present disclosure with reference to the accompanying drawings. In the present specification and drawings, components having substantially the same functions are denoted by the same reference numerals, and a repetitive description thereof is omitted.

First Embodiment

Configuration of Exhaust Gas Purification Apparatus

Hereinafter, a description will be given of a configuration of an exhaust gas purification apparatus according to a first embodiment with reference to FIG. 1.

FIG. 1 is a diagram illustrating an exemplary configuration of exhaust gas purification apparatus U according to the present embodiment.

Exhaust gas purification apparatus U according to the present embodiment is mounted on a vehicle, such as a truck, and purifies NOx in an exhaust gas of engine 10, for example.

Engine 10 is configured to include, for example, a combustion chamber, a fuel injection device for injecting fuel in the combustion chamber, and an engine ECU (not illustrated) for controlling the fuel injection device, and/or the like. Engine 10 burns and expands a mixture gas of fuel and air in the combustion chamber to generate power. In engine 10, intake passage 20 and exhaust passage 30 are connected with each other. Intake passage (e.g., intake pipe) 20 introduces air into the combustion chamber and exhaust passage (e.g., exhaust pipe) 30 discharges an exhaust gas discharged from the combustion chamber after combustion to the outside of the vehicle.

Note that, engine 10 according to the present embodiment is a four-cylinder engine and is configured such that intake passage 20 branches out to four combustion chambers through an intake manifold and merges into exhaust passage 30 from the four combustion chambers through an exhaust manifold.

Exhaust gas purification apparatus U includes SCR catalyst 40, urea-water injection device 50, various sensors 61 to 64, and Electronic Control Unit (ECU) 100.

SCR catalyst 40 adsorbs ammonia from hydrolyzed urea water supplied from urea-water injection device 50 and selectively subjects NOx in the exhaust gas to reduction purification by the adsorbed ammonia. As SCR catalyst 40, a publicly known SCR catalyst can be used, and for example, one in which a NOx reduction catalyst such as Fe zeolite, Cu zeolite or vanadium, for example, is supported on a surface of a support made of ceramic can be used. Note that, as SCR catalyst 40, an SCR catalyst of a type in which urea water is converted into ammonia on a catalyst may be used.

Urea-water injection device 50 injects urea water on an upstream side of SCR catalyst 40 in exhaust passage 30. Urea-water injection device 50 includes, for example, urea-water addition valve 51, urea-water tank 52, and supply pump 53

In urea-water injection device 50, urea water pumped from urea-water tank 52 by supply pump 53 is injected into exhaust passage 30 from urea-water addition valve 51. The urea water injected from urea-water addition valve 51 into exhaust passage 30 is hydrolyzed due to a high temperature of the exhaust gas, converted into ammonia, and supplied to SCR catalyst 40. Then, the ammonia is adsorbed onto SCR catalyst 40 and reacts with NOx under the action of SCR catalyst 40 to reduce and purify NOx.

The injection amount of urea water injected from urea-water injection device 50 to exhaust passage 30 is adjusted by the opening degree of urea-water addition valve 51. The opening degree of urea-water addition valve 51 is controlled by a control signal outputted from ECU 100 (urea-water injection control section 103).

Various sensors 61 to 64 are provided to detect a state of the exhaust gas flowing through exhaust passage 30, a state of SCR catalyst 40, and/or the like. Specifically, exhaust passage 30 is provided with upstream-side NOx sensor 61, downstream-side NOx sensor 62, temperature sensor 63, and flow rate sensor 64, for example.

Upstream-side NOx sensor 61 is placed on an upstream side of SCR catalyst 40 in exhaust passage 30 and detects the amount of NOx (i.e., the concentration of NOx) flowing into SCR catalyst 40. Downstream-side NOx sensor 62 is placed on a downstream side of SCR catalyst 40 in exhaust passage 30 and detects the amount of NOx (i.e., the concentration of NOx) flowing out of SCR catalyst 40. Temperature sensor 63 detects a temperature of the exhaust gas discharged from engine 10. Flow rate sensor 64 detects a flow rate of the exhaust gas discharged from engine 10. These various sensors 61 to 64 sequentially transmit the sensor information obtained by the detection to ECU 100.

ECU 100 (corresponding to the "control device" of the present invention) controls the operation of the exhaust gas purification apparatus U. ECU 100 includes, for example, a Central Processing Unit (CPU), a Read Only Memory (ROM), a Random Access Memory (RAM), an input port, an output port, and/or the like. Each function of ECU 100 to be described hereinafter in ECU 100 is realized by the CPU referring to a control program and various data stored in the ROM, RAM and/or the like. However, the function is not limited to the processing by software, and naturally, can be realized by a dedicated hardware circuit.

Note that, ECU 100 communicates with engine 10 and urea-water injection device 50 and/or the like, thereby controlling them and/or acquiring the state information on these components. Further, ECU 100 acquires sensor information from various sensors 61 to 64 to detect the state of the exhaust gas flowing through exhaust passage 30, the state of SCR catalyst 40, and/or the like.

Detailed Configuration of ECU 100

Next, a description will be given of an example of a detailed configuration of ECU 100 with reference to FIG. 2 to FIGS. 7A-FIG. 7C.

Figure 2:
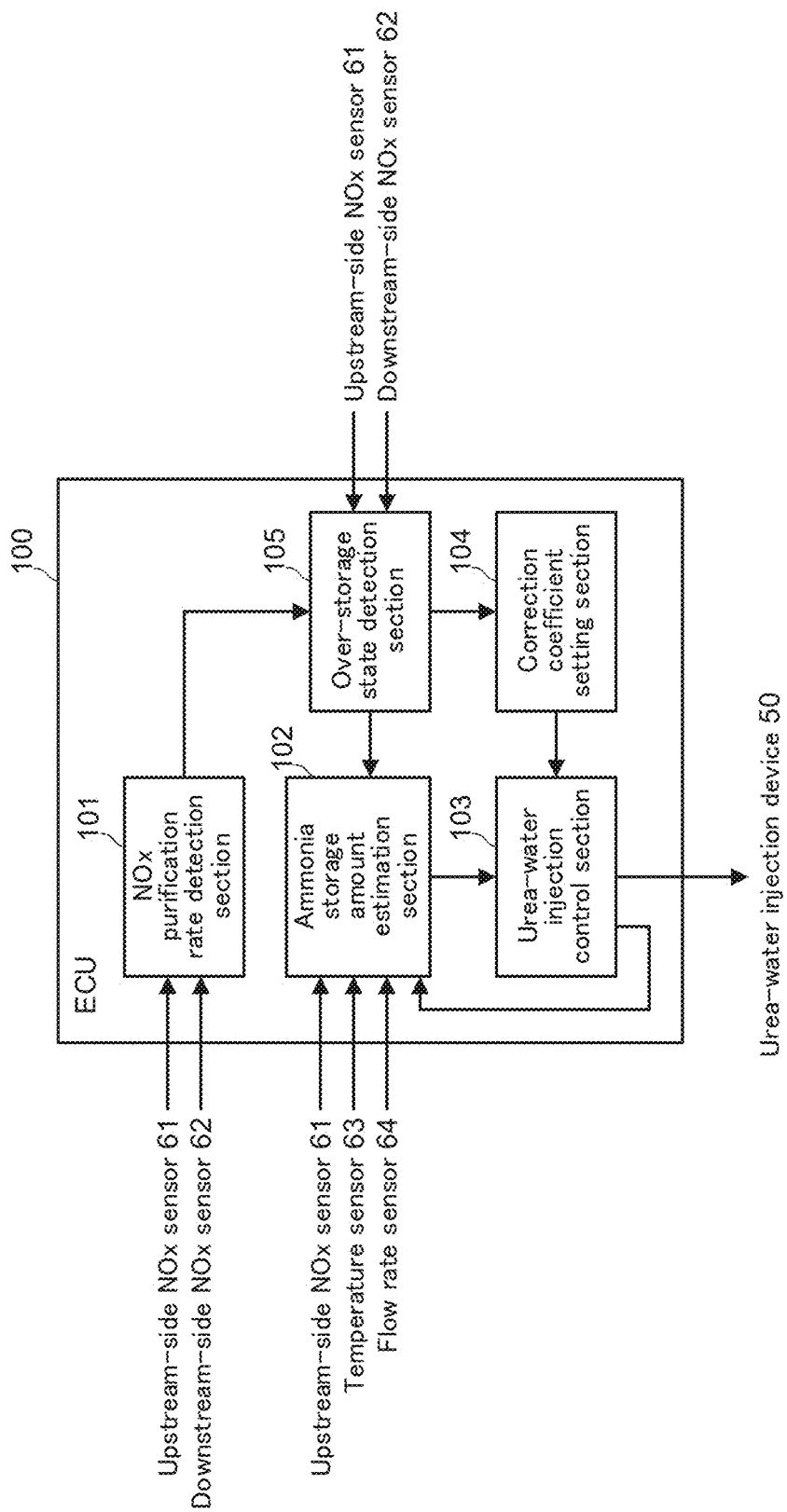
FIG. 2 is a block diagram illustrating an exemplary configuration of an ECU according to the first embodiment.

FIG. 2 is a block diagram illustrating an exemplary configuration of ECU 100 according to the present embodiment.

ECU 100 includes NOx purification rate detection section 101, ammonia storage amount estimation section 102, urea-water injection control section 103, correction coefficient setting section 104, and over-storage state detection section 105.

Regarding NOx Purification Rate Detection Section 101

NOx purification rate detection section 101 detects the NOx purification rate in SCR catalyst 40 and sends the NOx purification rate to over-storage state detection section 105. NOx purification rate detection section 101 detects the NOx purification rate in SCR catalyst 40, based on, for example, the sensor signal of upstream-side NOx sensor 61 (i.e., the amount of NOx flowing into SCR catalyst 40) and the sensor signal of downstream-side NOx sensor 62 (i.e., the amount of NOx flowing out of SCR catalyst 40).

Regarding Ammonia Storage Amount Estimation Section 102

Ammonia storage amount estimation section 102 estimates an ammonia storage amount in SCR catalyst 40. Ammonia storage amount estimation section 102 typically calculates an adsorption amount of ammonia newly adsorbed in SCR catalyst 40 based on the urea-water injection amount of urea-water injection device 50 and calculates a consumed amount of ammonia in SCR catalyst 40 based on the amount of NOx arriving in SCR catalyst 40. Then, ammonia storage amount estimation section 102 estimates the ammonia storage amount in SCR catalyst 40 at this time by subtracting the consumed amount of ammonia consumed in SCR catalyst 40 from the adsorption amount of ammonia newly adsorbed to SCR catalyst 40. In other words, ammonia storage amount estimation section 102 sequentially updates the ammonia storage amount at this time stored in a storage section (e.g., RAM) based on the transition of the urea-water injection amount and the transition of the consumed amount of ammonia in SCR catalyst 40.

Note that the consumed amount of ammonia in SCR catalyst 40 is calculated based on, for example, the amount of NOx arriving to SCR catalyst 40 (e.g., sensor information of upstream-side NOx sensor 61), the exhaust gas temperature (e.g., sensor information of temperature sensor 63), the exhaust gas flow rate (e.g., sensor information of flow rate sensor 64), and the ammonia storage amount in SCR catalyst 40 at this time.

When receiving a correction command from over-storage state detection section 105, ammonia storage amount estimation section 102 corrects the estimation value of the ammonia storage amount in SCR catalyst 40 at this time stored in a storage section (e.g., RAM) to a storage capacity of SCR catalyst 40 at this time. Thus, when the estimation value of the ammonia storage amount in SCR catalyst 40 deviates from the actual value, the estimation value of the ammonia storage amount in SCR catalyst 40 is again brought close to the actual value (to be described hereinafter with reference to FIG. 5).

The storage capacity of SCR catalyst 40 at this time is converted from SCR catalyst 40 at this time (i.e., exhaust gas temperature) using, for example, a control map stored in advance in a storage section (e.g., ROM).

Regarding Urea-Water Injection Control Section 103

Urea-water injection control section 103 controls urea-water injection from urea-water injection device 50 by outputting an opening degree command signal to urea water addition valve 51. At this time, for example, urea-water injection control section 103 controls the urea-water injection amount of urea-water injection device 50 so that the estimation value of the ammonia storage amount in SCR catalyst 40 estimated by ammonia storage amount estimation section 102 is maintained at a target value. Thus, SCR catalyst 40 is maintained in a state where the NOx purification rate is high.

Note that the target value of the ammonia storage amount in SCR catalyst 40 may be appropriately changed depending on the exhaust gas temperature and/or the like at this time.

Urea-water injection control section 103 calculates the urea-water injection amount based on, for example, a control map in which a difference between the estimation value and the target value of the ammonia storage amount in SCR catalyst 40 at this time and the urea-water injection amount are associated with each other. Then, urea-water injection control section 103 determines a value obtained by multiplying the urea-water injection amount calculated using the control map by a urea-water injection correction coefficient (e.g., any value between 0.5 and 1.5) set in correction coefficient setting section 104 as the urea-water injection amount to be informed as a command to urea-water injection device 50.

Regarding Correction Coefficient Setting Section 104

Correction coefficient setting section 104 sets a urea-water injection correction coefficient serving as a correction coefficient when the urea-water injection amount is determined by urea-water injection control section 103.

The urea-water injection correction coefficient is mainly set to correct a device error of urea-water injection device 50 (e.g., an error of the actual valve opening degree of urea water addition valve 51 with respect to the valve opening degree indicated by the opening degree command signal. That is, the urea-water injection amount actually injected by urea-water injection device 50 deviates from the command value from urea-water injection control section 103 due to a device error of urea-water injection device 50 in some cases, so that exhaust gas purification device U corrects the device error based on the urea-water injection correction coefficient.

The urea-water injection correction coefficient, for example, is set to "1.0" in the initial state and is reduced in a stepwise manner to "0.9," "0.8," and so forth in accordance with the correction command from over-storage state detection section 105. The urea-water injection correction coefficient functions to match the urea-water injection amount according to the command value from urea-water injection control section 103 with the urea-water injection amount actually injected by urea-water injection device 50.

Note that, setting the urea-water injection correction coefficient appropriately leads to an improvement in the estimation accuracy in ammonia storage amount estimation section 102 and also facilitates reducing the frequency of occurrence of a state where the estimation value of the ammonia storage amount deviates from the actual value.

Regarding Over-Storage State Detection Section 105

Over-storage state detection section 105 detects occurrence of an over-storage state in SCR catalyst 40. Then, when detecting occurrence of the over-storage state in SCR catalyst 40, over-storage state detection section 105 outputs a correction command (corresponding to an "abnormality detection signal" of the present invention) to ammonia storage amount estimation section 102 and correction coefficient setting section 104.

Over-storage state detection section 105 detects occurrence of the over-storage state in SCR catalyst 40 by using the characteristics such that, because of continuous ammonia from SCR catalyst 40 during an over-storage state in SCR catalyst 40, a certain amount of NOx is continuously detected downstream of SCR catalyst 40, and in addition, a correlation between the amount of NOx detected downstream of SCR catalyst 40 and the amount of NOx detected upstream of SCR catalyst 40 becomes weak.

Specifically, over-storage state detection section 105 monitors transitions of the respective detection values of upstream-side NOx sensor 61 and downstream-side NOx sensor 62, and when the NOx purification rate of SCR catalyst 40 decreases to a first threshold value or less, over-storage state detection section 105 determines whether the change amount of the detection value of upstream-side NOx sensor 61 per unit time (e.g., one second) is equal to or greater than a second threshold value (hereinafter, referred to as "first condition") and the change amount of the detection value of downstream-side NOx sensor 62 per unit time (e.g., one second) is equal to or less than a third threshold value (hereinafter, referred to as "second condition"). In a case where the first condition and the second condition are both satisfied, over-storage state detection section 105 determines that the over-storage state occurs in SCR catalyst 40.

Note that, as the first threshold value serving as a determination criterion for a decrease in the NOx purification rate of SCR catalyst 40, for example, a certain NOx purification rate which is normally detected when an over-storage state occurs is set (e.g., set to about 70%).

Figure 3A:
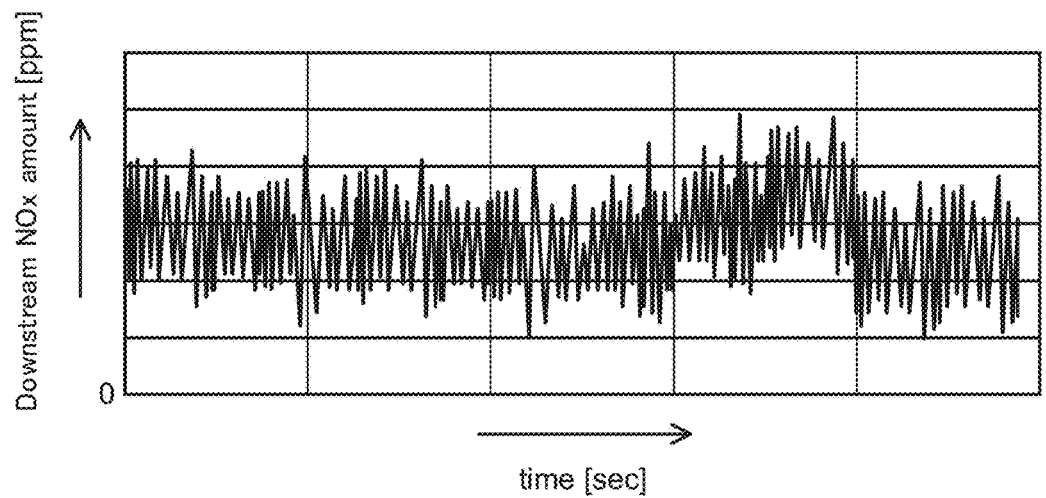
FIG. 3A is a diagram illustrating an example of behavior of the amount of NOx detected downstream of an SCR catalyst in an over-storage state.
Figure 3B:
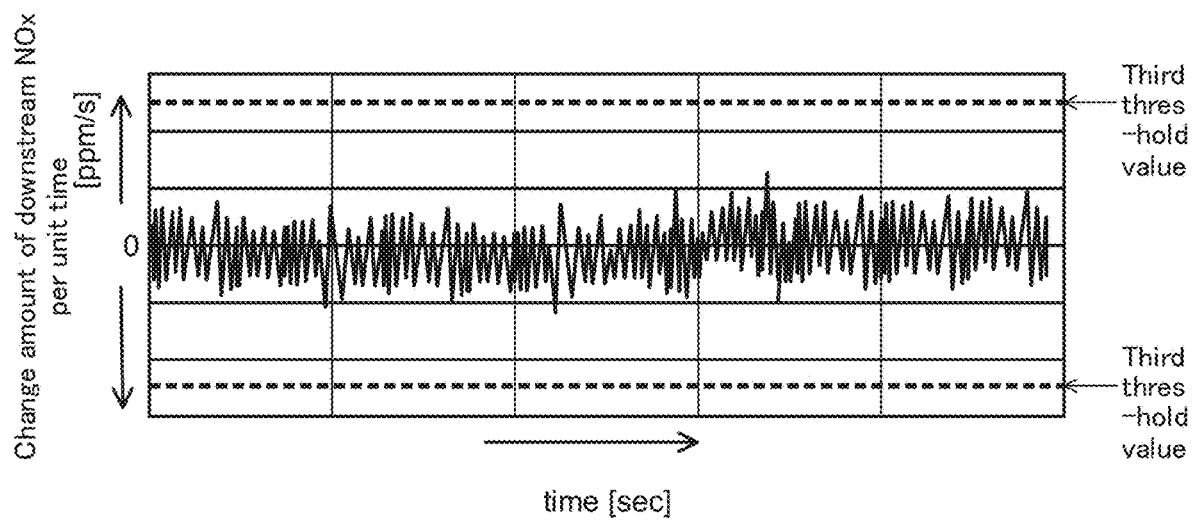
FIG. 3B is a diagram illustrating an example of behavior of the change amount of the NOx in the over-storage state.
Figure 4A:
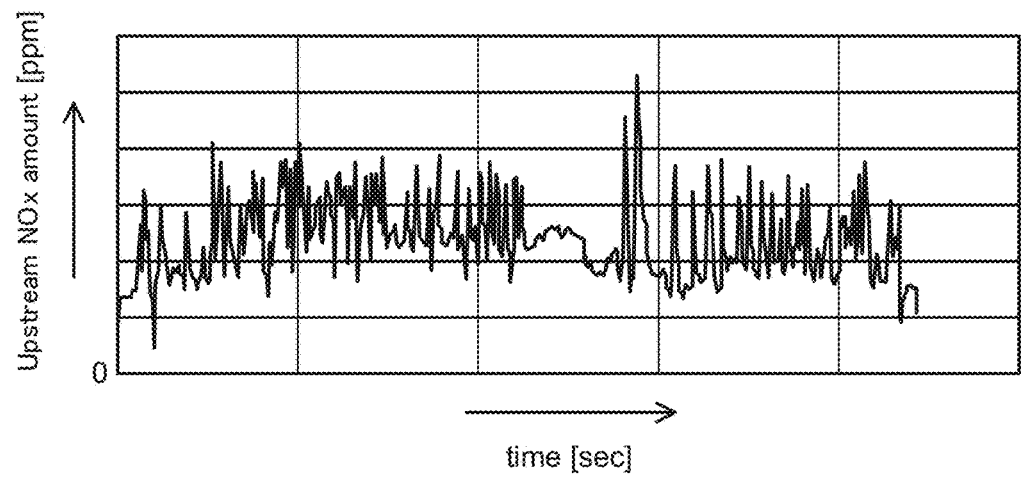
FIG. 4A is a diagram illustrating an example of behavior of the amount of NOx detected upstream of the SCR-catalyst in an over-storage state.
Figure 4B:
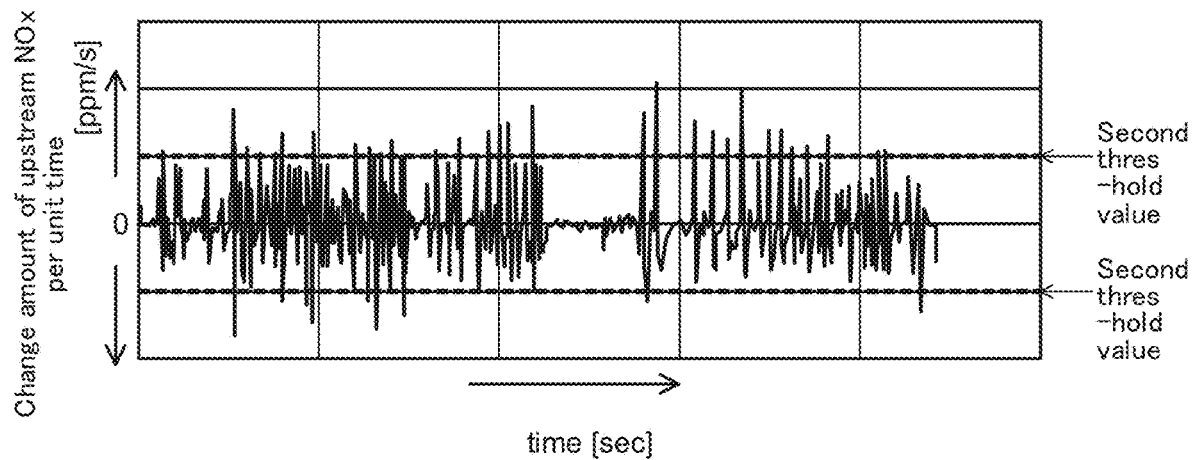
FIG. 4B is a diagram illustrating an example of behavior of the change amount of the NOx in the over-storage state.

FIG. 3A is a diagram illustrating an example of behavior of the amount of NOx detected downstream of SCR catalyst 40 in an over-storage state, and FIG. 3B is a diagram illustrating an example of behavior of the change amount of the NOx in the over-storage state. FIG. 4A is a diagram illustrating an example of behavior of the amount of NOx detected upstream of SCR-catalyst 40 in an over-storage state, and FIG. 4B is a diagram illustrating an exemplary behavior of the change amount of the NOx in the over-storage state.

The amount of NOx detected downstream of SCR catalyst 40 in an over-storage state is mainly detected due slipped ammonia in SCR catalyst 40 (see FIG. 3). Further, the NOx purification rate itself in SCR catalyst 40 is maintained at a high level to some extent in the over-storage state, and therefore, the amount of NOx detected downstream of SCR catalyst 40 does not include much NOx which is contained in the exhaust gas from the upstream and which has flowed out without being purified by SCR catalyst 40.

Therefore, over-storage state detection section 105 determines whether or not the change amount of the detection value of downstream-side NOx sensor 62 per unit time is equal to or less than the third threshold value (second condition), thereby detecting the state in which ammonia slip from SCR catalyst 40 occurs continuously. As the third threshold value serving as a determination criterion for over-storage state detection section 105, a reference value indicating that a variation of the amount of NOx detected downstream of SCR catalyst 40 is small is set (e.g., set to ±5 ppm/s).

Meanwhile, the amount of NOx detected upstream of SCR catalyst 40 is the amount of NOx contained in the exhaust gas discharged from engine 10 and varies greatly according to the operation state of engine 10 (see FIG. 4A).

Therefore, over-storage state detection section 105 determines whether or not the change amount of the detection value of upstream-side NOx sensor 61 per unit time is equal to or greater than the second threshold value (first condition), thereby detecting the state in which the amount of NOx detected upstream of SCR catalyst 40 dynamically changes to some extent. That is, determining the state in which the first condition is satisfied in addition to the second condition makes it possible to confirm that the amount of NOx detected downstream of SCR catalyst 40 is stable under the situation in which the amount of NOx flowing into SCR catalyst 40 dynamically changes to some extent. That is, determining whether or not the first condition and the second condition are both satisfied makes it possible to identify whether the cause of a decrease in the NOx purification rate of SCR catalyst 40 is an under storage state in SCR catalyst 40 or an over storage state in SCR catalyst 40.

Note that, as the second threshold value serving as a determination criterion for over-storage state detection section 105, a reference value indicating that the amount of NOx detected upstream changes dynamically to some extent is set (e.g., set to ±50 ppm/s).

Note that, it is favorable that over-storage state detection section 105 determines the continuity of the state. Therefore, it is favorable that over-storage state detection section 105 determines that the second condition is satisfied, for example, in a case where the state in which the change amount of the detection value of downstream-side NOx sensor 62 per unit time is equal to or less than the third threshold (e.g., ±5 ppm/s) continues within a predetermined determination time (e.g., 60 seconds). Likewise, it is favorable that over-storage state detection section 105 determines that the first condition is satisfied in a case where the state in which the change amount of the detection value of upstream-side NOx sensor 61 per unit time is equal to or greater than the second threshold value (e.g., ±50 ppm/s) is equal to or greater than a predetermined frequency within a predetermined determination time (e.g., 60 seconds).

Figure 5:
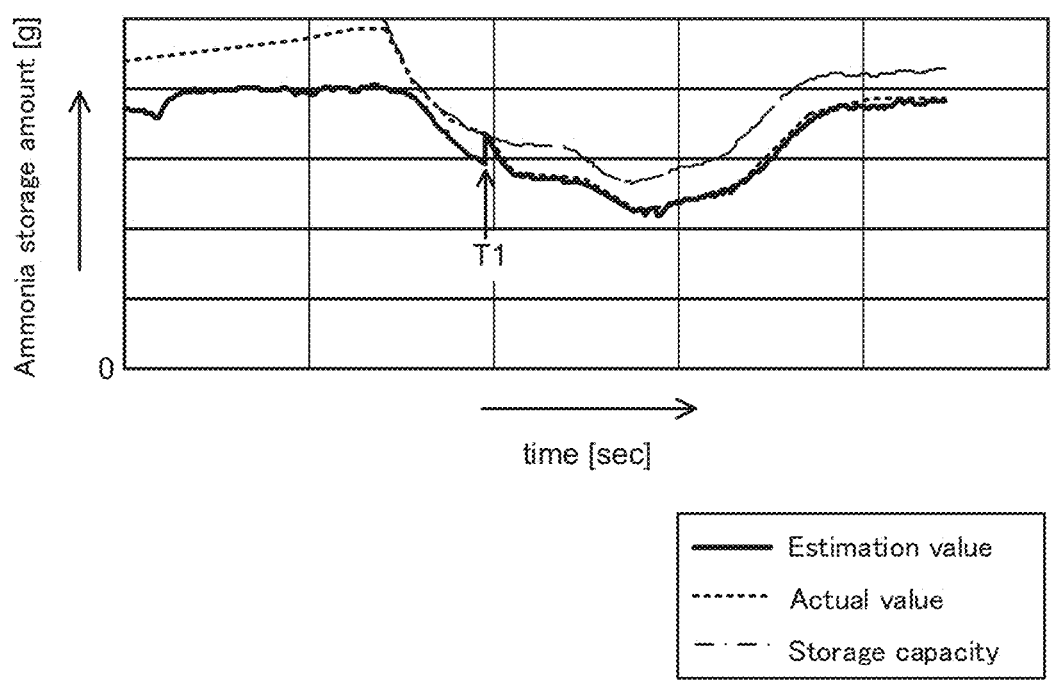
FIG. 5 is a diagram for describing a correction processing performed by an over-storage state detection section according to the first embodiment.

FIG. 5 is a diagram for describing a correction processing by over-storage state detection section 105. The graphs in FIG. 5 indicates the following transitions.

Solid line graph: transition of the estimation value of ammonia storage amount in SCR catalyst 40.

Dotted line graph: transition of the actual value of ammonia storage amount in SCR catalyst 40.

Dashed-dotted line graph: transition of the storage capacity in SCR catalyst 40.

Note that, arrow T1 in FIG. 5 indicates the timing at which the correction processing is performed.

When detecting occurrence of the over-storage state in SCR catalyst 40, over-storage state detection section 105 issues a correction command to instruct ammonia storage amount estimation section 102 to correct the estimation value of the ammonia storage amount and issues a correction command to instruct correction coefficient setting section 104 to correct the urea-water injection correction coefficient.

The over-storage state is a state in which the ammonia in SCR catalyst 40 is accumulated to a limit of the storage capacity of SCR catalyst 40. Therefore, when the occurrence of the over-storage state is detected, this means that, although the actual value of the ammonia storage amount is substantially 100% of the storage capacity, the estimation value of the ammonia storage amount is estimated to be about 80% of the storage capacity (i.e., the estimation value of the ammonia storage amount deviates from the actual value).

Therefore, when the over-storage state is detected, over-storage state detection section 105 issues a correction command for correcting the estimation value of the ammonia storage amount to the storage capacity of SCR catalyst 40 at this time.

The storage capacity of SCR catalyst 40 herein varies depending on the temperature of SCR catalyst 40 and typically decreases as the temperature of SCR catalyst 40 rises. For this reason, when receiving a correction command from over-storage state detection section 105, ammonia storage amount estimation section 102 calculates the storage capacity of SCR catalyst 40 at this time based on the exhaust gas temperature at this time, using, for example, a control map stored in advance, and corrects the estimation value of the ammonia storage amount at this time to the storage capacity Note that, in FIG. 5, at the timing of T1, ammonia storage amount estimation section 102 indicates an aspect in which the estimation value of the ammonia storage amount in SCR catalyst 40 is corrected to the storage capacity of SCR catalyst 40 at this timing. In FIG. 5, this correction processing sets a state in which the estimation value of the ammonia storage amount in SCR catalyst 40 matches the actual value at and after T1.

Further, when the over-storage state is detected, over-storage state detection section 105 makes a correction in a direction in which the urea-water injection correction coefficient decreases. As a result, the urea-water injection correction coefficient is more appropriately set. In other words, this leads to an improvement in estimation accuracy of ammonia storage amount estimation section 102 and also reduces the frequency of occurrence of a state in which the estimation value of the ammonia storage amount deviates from the actual value.

Figure 6:
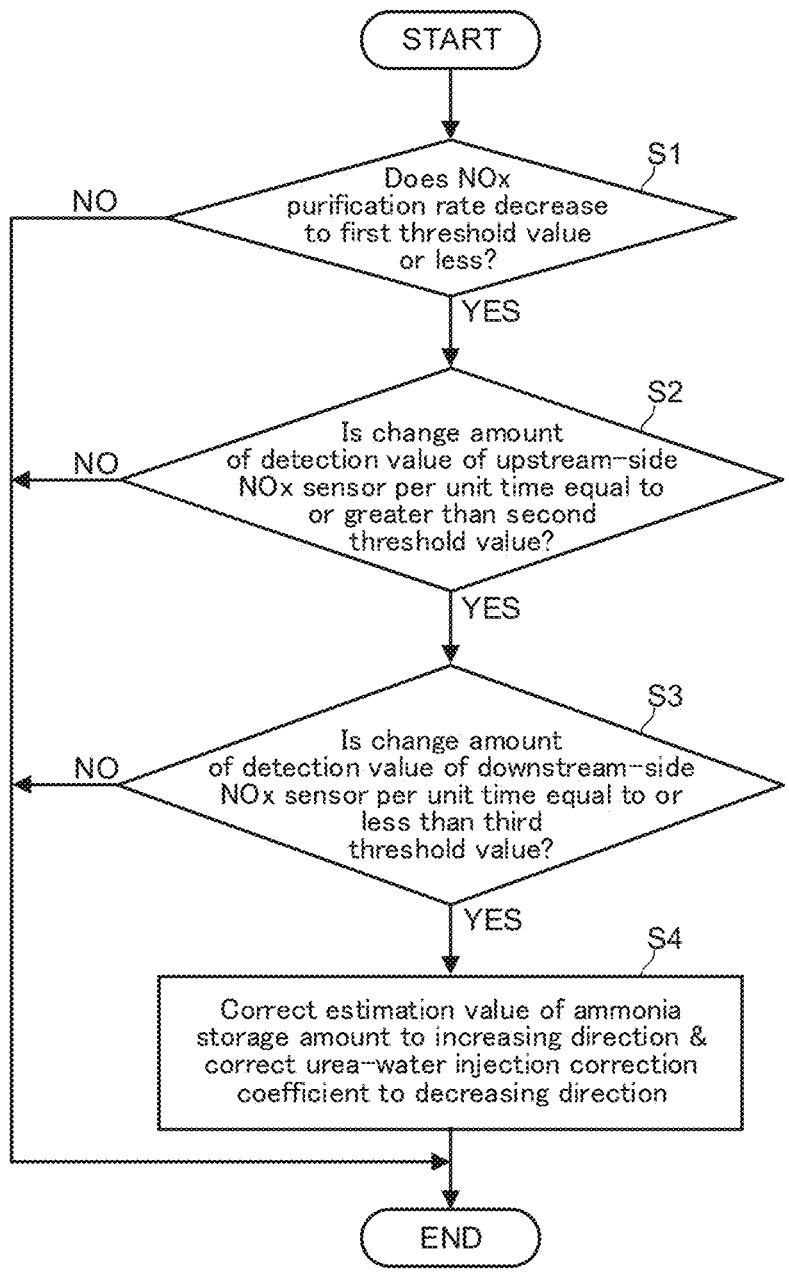
FIG. 6 is a diagram illustrating an example of a specific operation flow performed by the over-storage state detection section according to the first embodiment.

FIG. 6 is a diagram illustrating an example of a specific operation flow performed by over-storage state detection section 105. The flowchart illustrated in FIG. 6 is executed, for example, in accordance with a computer program by ECU 100 at predetermined intervals (e.g., every 100 ms).

Figure 7A:
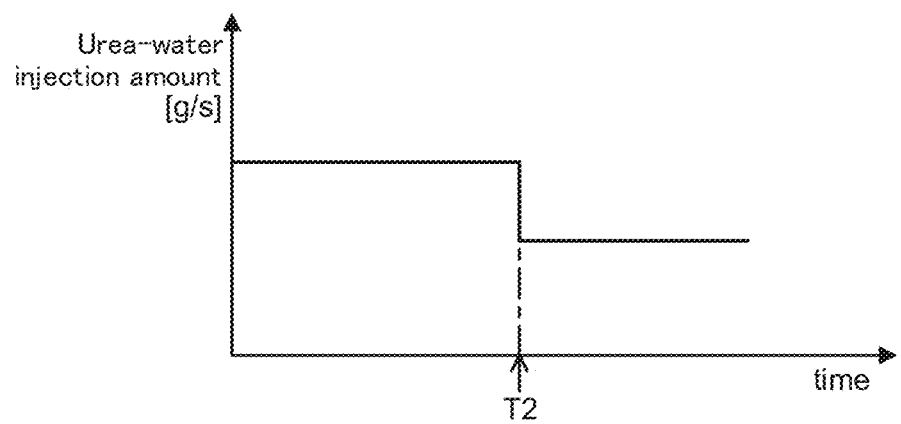
FIG. 7A, FIG. 7B, and FIG. 7C are time charts respectively illustrating examples of behavior of a urea-water injection amount, an ammonia storage amount in the SCR catalyst, and a NOx purification rate in the SCR catalyst in the exhaust gas purification apparatus according to the first embodiment.
Figure 7B:
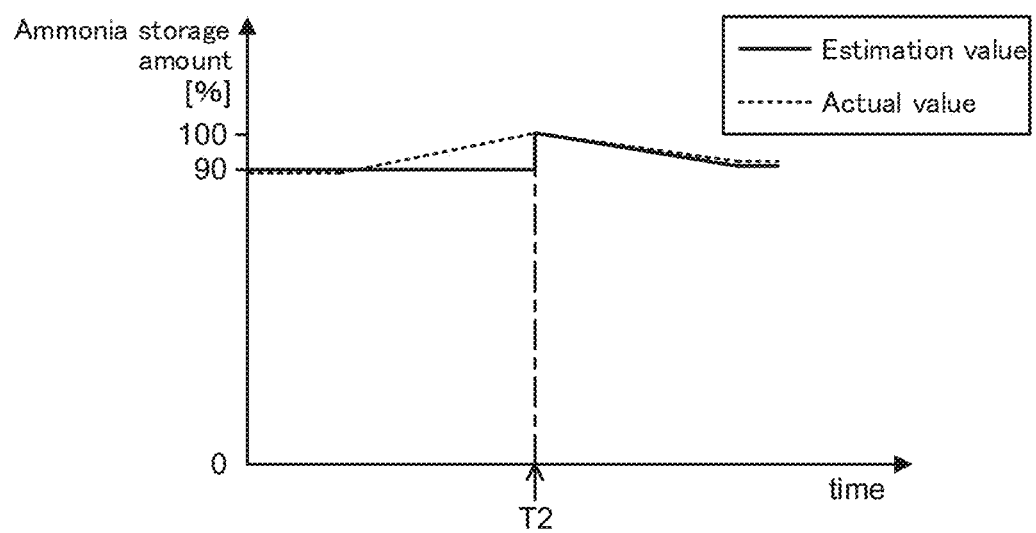
Figure 7C:
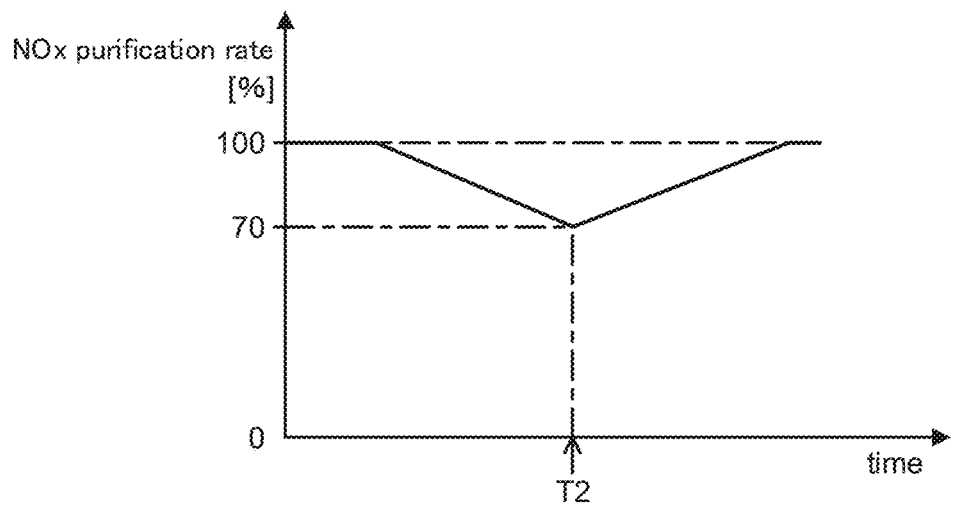

FIG. 7A is a time chart indicating an example of behavior of the urea-water injection amount in urea-water injection device 50. FIG. 7B is a time chart indicating an example of behavior of the ammonia storage amount in SCR catalyst 40. FIG. 7C is a time chart indicating an example of behavior of the NOx purification rate in SCR catalyst 40. Note that, timing T2 in FIG. 7A, FIG. 7B, and FIG. 7C represents a timing at which over-storage state detection section 105 issues a correction command Note that, FIG. 7B indicates the behavior of the estimation value (solid line) and the actual value (dotted line) of the ammonia storage amount in SCR catalyst 40. Further, exhaust gas purification apparatus U herein controls the urea-water injection amount so that the estimation value of the ammonia storage amount in SCR catalyst 40 becomes 90% of the storage capacity of SCR catalyst 40.

In step S, over-storage state detection section 105 determines whether or not the NOx purification rate in SCR catalyst 40 decreases to the first threshold value (e.g., 70%) or less. When the NOx purification rate in SCR catalyst 40 does not decrease to the first threshold value or less (step S1: NO), herein, over-storage state detection section 105 ends the processing of the flowchart of FIG. 6 without executing any particular processing. Meanwhile, when the NOx purification rate in SCR catalyst 40 decreases to the first threshold value or less (step S1: YES), over-storage state detection section 105 advances the processing to step S2.

Note that, in step S1, over-storage state detection section 105 may determine whether or not the NOx purification rate in SCR catalyst 40 decreases, based on an integral value of the NOx purification rate. This make it possible to avoid performing an unnecessary test operation due to noise in detecting the NOx purification rate.

In step S2, over-storage state detection section 105 determines whether or not the change amount of the detection value of upstream-side NOx sensor 61 per unit time is equal to or greater than the second threshold value. When the change amount of the detection value of upstream-side NOx sensor 61 is less than the second threshold value (step S2: NO), herein, over-storage state detection section 105 ends the processing of the flowchart of FIG. 6 without executing any particular processing. Meanwhile, when the change amount of the detection value of upstream-side NOx sensor 61 is equal to or greater than the second threshold value (step S2: YES), over-storage state detection section 105 advances the processing to step S3.

In step S3, over-storage state detection section 105 determines whether or not the change amount of the detection value of downstream-side NOx sensor 62 per unit time is equal to or less than the third threshold value. When the change amount of the detection value of downstream-side NOx sensor 62 is greater than the third threshold value (step S3: NO), herein, over-storage state detection section 105 ends the processing of the flowchart of FIG. 6 without executing any particular processing. Meanwhile, when the change amount of the detection value of downstream-side NOx sensor 62 is equal to or less than the third threshold value (step S3: YES), over-storage state detection section 105 advances the processing to step S4.

In step S4, over-storage state detection section 105 determines that an over-storage state occurs, and sends a correction command to ammonia storage amount estimation section 102 and correction coefficient setting section 104.

As a result, ammonia storage amount estimation section 102 make a correction such that the estimation value of the ammonia storage amount of SCR catalyst 40 at this time stored in a storage section, for example, a RAM, increases.

At this time, for example, ammonia storage amount estimation section 102 corrects the estimation value of the ammonia storage amount of SCR catalyst 40 at this time stored in the storage section, e.g., the RAM, to the storage capacity of SCR catalyst 40 at this time.

Note that, in step S4, the processing in which ammonia storage amount estimation section 102 increases the estimation value of the ammonia storage amount may be any method. This processing may be, for example, a process of increasing an estimation value of the ammonia storage amount in a stepwise manner (e.g., 5% each). Even with such a method, repeatedly executing the processing of the flowchart of FIG. 6 makes it possible to bring the estimation value of the ammonia storage amount close to the actual value.

Further, correction coefficient setting section 104 which has received the correction command from over-storage state detection section 105 makes a correction such that the urea-water injection correction coefficient at this time stored in the storage section (e.g., RAM) decreases. At this time, correction coefficient setting section 104 corrects the urea-water injection correction coefficient at this time stored in the storage section (e.g., RAM) to be in a direction of decreasing for one step.

This step S4 causes the urea-water injection amount injected from urea-water injection device 50 to decrease compared with the amount before detection of the over-storage state, and the NOx purification rate in SCR catalyst 40 recovers over time (see FIG. 7C).

Further, decreasing the urea-water injection correction coefficient by this step S4 causes the urea-water injection amount per unit amount of the difference between the estimation value and the target value of the ammonia storage amount to decrease, so that an excessive injection due to a device error of urea-water injection device 50 can be suppressed.

Note that, when performing step S4, it is desirable to prohibit execution of the processing of the flowchart in FIG. 6 for a predetermined time (e.g., 10 minutes). Thus, it is possible to suppress repeatedly performing the processing of correcting the estimation value of the ammonia storage amount of SCR catalyst 40 and the urea-water injection correction coefficient before the NOx purification rate in SCR catalyst 40 recovers.

The processing described above eliminates a deviation between the estimation value and the actual value of the ammonia storage amount of SCR catalyst 40. Further, since the urea-water injection correction coefficient is also set to an appropriate value, the frequency of occurrence of the deviation between the estimation value and the actual value of the ammonia storage amount of SCR catalyst 40 is also suppressed in the long term.

Effects

As described above, according to exhaust gas purification apparatus U of the present embodiment, occurrence of an over-storage state in an SCR catalyst can be detected at an early stage. Further, according to exhaust gas purification apparatus U of the present embodiment, it is possible to detect the occurrence of an over-storage state in the SCR catalyst with high accuracy. Thus, an estimation value of the ammonia storage amount and a urea-water injection correction coefficient can be appropriately corrected.

Second Embodiment

Next, a description will be given of a configuration of ECU 100 according to a second embodiment with reference to FIG. 8 and FIG. 9. ECU 100 according to the present embodiment is different from that of the first embodiment in determination conditions in over-storage condition detection section 105. Note that, the description of the configuration common to the first embodiment is omitted.

Over-storage state detection section 105 according to the present embodiment sets a third condition and a fourth condition to be conditions for determining whether or not an over-storage state occurs, in addition to the first condition and the second condition described above, from the viewpoint of suppressing false detection of the over-storage state.

Figure 8A:
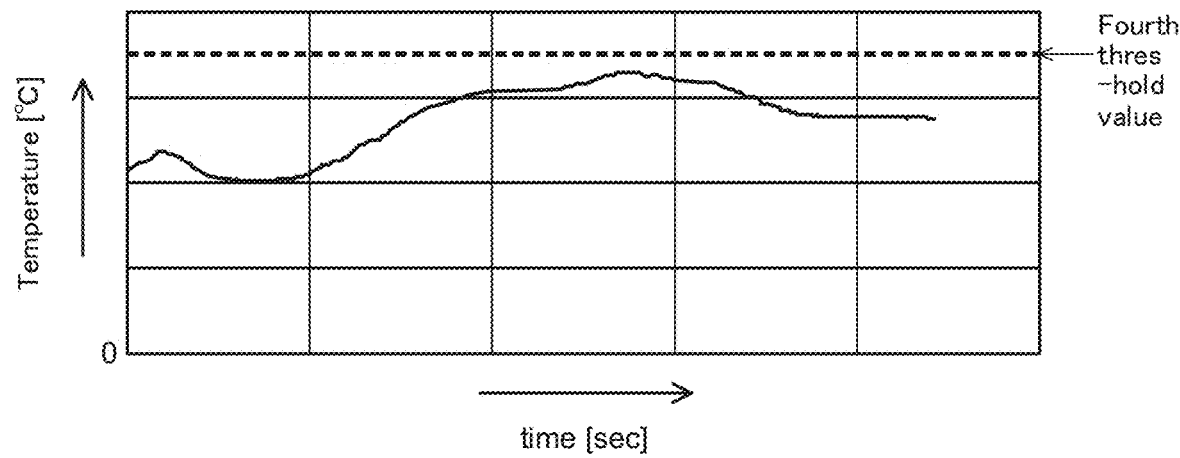
FIG. 8A is a diagram illustrating an example of behavior of a temperature of the SCR catalyst.
Figure 8B:
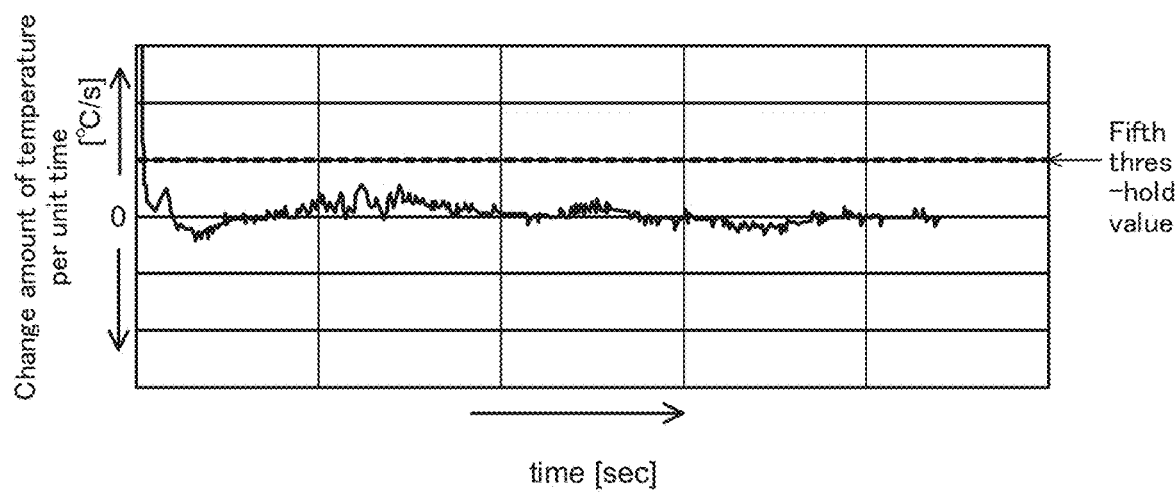
FIG. 8B is a diagram illustrating an example of behavior of the change amount of the temperature.

FIG. 8A is a diagram illustrating an example of behavior of a temperature of SCR catalyst 40, and FIG. 8B is a diagram illustrating an example of behavior of the change amount.

Figure 9:
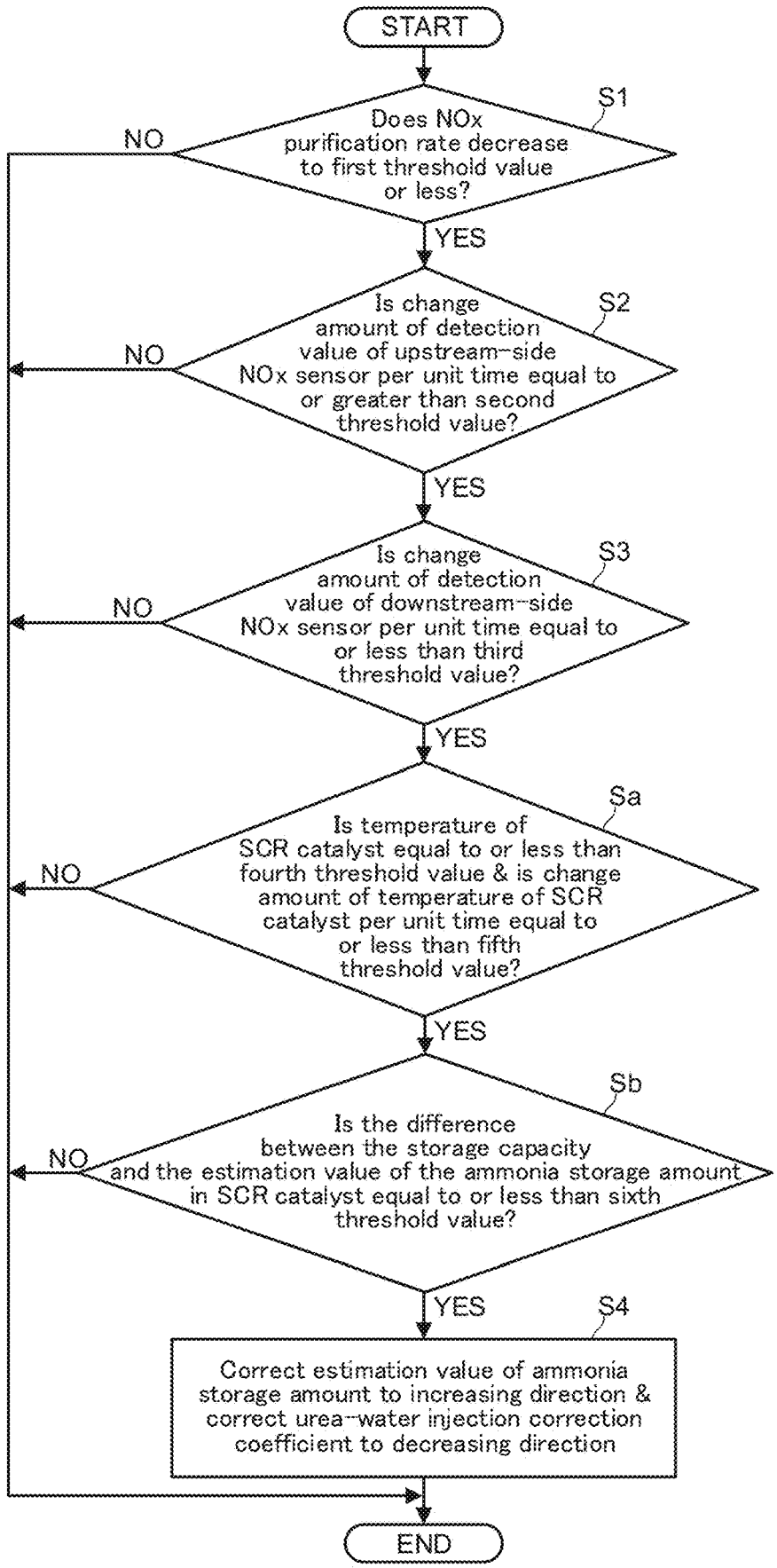
FIG. 9 is a diagram illustrating an example of a specific operation flow performed by the over-storage state detection section according to a second embodiment.

FIG. 9 is a diagram illustrating an example of a specific operation flow performed by over-storage state detection section 105 according to the present embodiment.

The flowchart of FIG. 9 is different from the flowchart of FIG. 6 in that the determination processing of step Sa corresponding to the third condition and the determination processing of step Sb corresponding to the fourth condition are added after step S3 of the flowchart of FIG. 6.

First, as the third condition, over-storage state detection section 105 determines whether or not the temperature of SCR catalyst 40 is equal to or less than a fourth threshold value and whether or not the change amount of the temperature of SCR catalyst 40 is equal to or less than a fifth threshold value (step Sa). When the temperature of SCR catalyst 40 is equal to or less than the fourth threshold value and the change amount of the temperature of SCR catalyst 40 is equal to or less than the fifth threshold value (step Sa: YES), over-storage state detection section 105 determines that the over-storage state has been possibly occurring in SCR catalyst 40. Meanwhile, when the third condition is not satisfied (step Sa: NO), over-storage state detection section 105 determines that it is not an appropriate determination timing (step Sa) and ends the processing of the flowchart of FIG. 9.

In general, the temperature of SCR catalyst 40 varies temporally depending on the operation state of engine 10 because the temperature of SCR catalyst 40 is dependent on the exhaust gas temperature (see FIG. 8A and FIG. 8B). Then, when the temperature of SCR catalyst 40 is high, ammonia slip from SCR catalyst 40 occurs regardless of whether an over-storage state occurs in SCR catalyst 40. In particular, when the temperature of SCR catalyst 40 rises rapidly, the amount of ammonia slip from SCR catalyst 40 also increases.

In order to avoid a state of erroneously detecting that the over-storage state occurs in SCR catalyst 40 due to the ammonia slip during the high temperature, over-storage state detection section 105 sets the third condition as a further determination condition. Note that, for example, 350° C. is set as the fourth threshold value for the temperature of SCR catalyst 40, which serves as a determination criterion for over-storage state detection section 105, and for example, 5° C./s is set as the fifth threshold value for the temperature change of SCR catalyst 40.

Further, as the fourth condition, over-storage state detection section 105 determines whether or not the difference between the storage capacity and the estimation value of the ammonia storage amount in SCR catalyst 40 is equal to or less than a sixth threshold value (step Sb). When the difference between the storage capacity and the estimation value of the ammonia storage amount in SCR catalyst 40 is equal to or less than the sixth threshold value (step Sb: YES), over-storage state detection section 105 determines that the over-storage state has been possibly occurring in SCR catalyst 40. Meanwhile, when the fourth condition is not satisfied (step Sb: NO), over-storage state detection section 105 determines that it is not an appropriate determination timing, and ends the processing of the flowchart of FIG. 9.

In general, the storage capacity of SCR catalyst 40 depends on the temperature of SCR catalyst 40 and thus varies temporally depending on the operation state of engine 10 (see dashed-dotted line graph in FIG. 5). Then, when the storage capacity of SCR catalyst 40 decreases, for example, when the temperature of SCR catalyst 40 rises rapidly, the ammonia slip from SCR catalyst 40 occurs. That is, when the estimation value of the ammonia storage amount is near the storage capacity of SCR catalyst 40, over-storage state detection section 105 possibly determines that the estimation value of the ammonia storage amount deviates from the actual value, even though the estimation value of the ammonia storage amount does not deviate from the actual value.

In order to avoid such a false determination, over-storage state detection section 105 sets the fourth condition as a further determination condition. Note that, in this case, it can be said that the over-storage state temporarily occurs in SCR catalyst 40, but since the estimation value of the ammonia storage amount does not deviate from the actual value, over-storage state detection section 105 according to the present embodiment sets the fourth condition as a further determination condition from the viewpoint of avoiding execution of the correction processing itself.

The sixth threshold value for the difference between the storage capacity and the estimation value of the ammonia storage amount, which serves as a determination criterion for over-storage state detection section 105, is set (e.g., set to about 5%).

As described above, according to ECU 100 of the present embodiment, it is possible to detect, with higher accuracy, an over-storage state in SCR catalyst 40, that is, a state in which an estimation value of the ammonia storage amount deviates from an actual value.

Other Embodiments

The present invention is not limited to the above embodiments, and various modifications are possible.

In the above embodiments, the description has been given, as an example, of the configuration in which the functions of NOx purification rate detection section 101, ammonia storage amount estimation section 102, urea-water injection control section 103, correction-coefficient setting section 104, and over-storage state detection section 105 are realized by a single computer, but these functions may be realized by a plurality of computers, naturally. For example, the function of ammonia storage amount estimation section 102 and the function of urea-water injection control section 103 may be provided in separate ECUs, respectively.

Further, in the above embodiments, the description has been given, as an example, of an aspect in which exhaust gas purification apparatus U is applied to a diesel engine. Exhaust gas purification apparatus U according to the present embodiment, however, can be applied to a gasoline engine without being limited to a diesel engine.

In the above embodiments, the vehicle is illustrated as an example of the application target of exhaust gas purification apparatus U, but the application target of exhaust gas purification apparatus U is not limited to this. For example, exhaust gas purification apparatus U may be applied to a power generator, a construction machine, a vessel, and/or the like.

While specific examples of the present invention have been described in detail thus far, these examples are merely illustrative and do not limit the appended claims. The art described in the appended claims includes various modifications and variations of the specific examples illustrated above.

This application is based on Japanese Patent Application No. 2019-009471, filed on Jan. 23, 2019, the entire contents of which are incorporated herein by reference.

INDUSTRIAL APPLICABILITY

According to an exhaust gas purification apparatus of the present disclosure, occurrence of an over-storage state in an SCR catalyst can be detected at an early stage.

The invention claimed is:

1. An exhaust gas purification apparatus placed at an exhaust passage of an internal combustion engine, the apparatus comprising:
   a Selective Catalytic Reduction (SCR) catalyst placed in the exhaust passage;
   an upstream-side NOx sensor and a downstream-side NOx sensor detecting a NOx amount in an exhaust gas on an upstream side and a downstream side of the SCR catalyst, respectively;
   a urea-water injection device which injects urea water on the upstream side of the SCR catalyst in the exhaust passage; and
   a control device which estimates an ammonia storage amount in the SCR catalyst and controls a urea-water injection amount of the urea-water injection device based on an estimation value of the ammonia storage amount, wherein
   the control device monitors a change amount of a detection value of each of the upstream-side NOx sensor and the downstream-side NOx sensor, and
   the control device generates an abnormality detection signal indicating that an over- storage state occurs in the SCR catalyst in a case where the change amount of the detection value of the upstream-side NOx sensor per unit time is equal to or greater than a second threshold value and the change amount of the detection value of the downstream-side NOx sensor per unit time is equal to or less than a third threshold, when a NOx purification rate of the SCR catalyst decreases to a first threshold value or less.

2. The exhaust gas purification apparatus according to claim 1, wherein the control device generates the abnormality detection signal only in a case where a temperature of the SCR catalyst is equal to or less than a fourth threshold value and a change amount of the temperature of the SCR catalyst is equal to or less than a fifth threshold value.

3. The exhaust gas purification apparatus according to claim 1, wherein the control device generates the abnormality detection signal only in a case where a difference between an ammonia storage capacity in the SCR catalyst and the estimation value of the ammonia storage amount is equal to or greater than a sixth threshold value.

4. The exhaust gas purification apparatus according to claim 1, wherein, when generating the abnormality detection signal, the control device corrects the estimation value of the ammonia storage amount to a storage capacity of the SCR catalyst at this time.

5. The exhaust gas purification apparatus according to claim 1, wherein, when generating the abnormality detection signal, the control device corrects a correction coefficient for adjusting the urea-water injection amount such that the urea-water injection amount per unit amount of a difference between the estimation value and a target value of the ammonia storage amount decreases.

6. A vehicle, comprising the exhaust gas purification apparatus according to claim 1.

* * * * *

UNITED STATES PATENT AND TRADEMARK OFFICE
CERTIFICATE OF CORRECTION

PATENT NO. : 11,761,364 B2
APPLICATION NO. : 17/424759
DATED : September 19, 2023
INVENTOR(S) : Akihiro Sawada et al.

Page 1 of 1

It is certified that error appears in the above-identified patent and that said Letters Patent is hereby corrected as shown below:

On the Title Page

In item (73) Assignee:
"Isuzo Motors Limited"
Should be changed to:
--Isuzu Motors Limited--

Signed and Sealed this
Fifth Day of November, 2024

Katherine Kelly Vidal
*Director of the United States Patent and Trademark Office*